Figure 1:
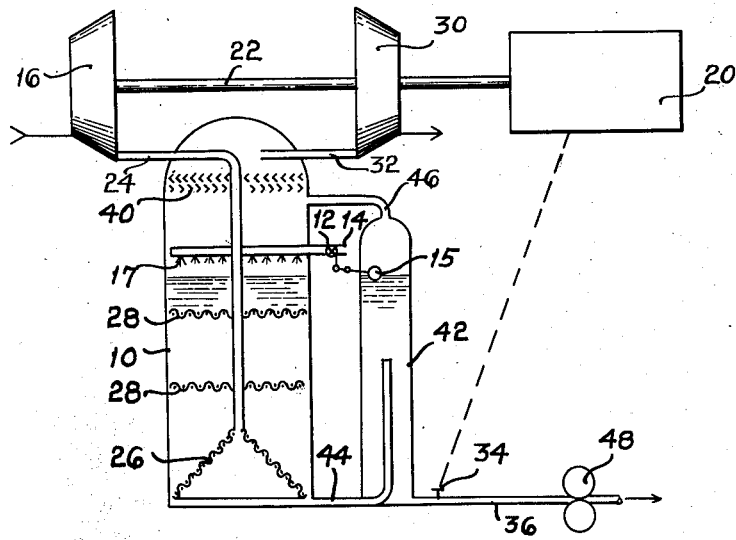

Dec. 29, 1953  W. R. BRISKEN ET AL  2,664,001
AIR CYCLE WATER COOLER

Filed Sept. 8, 1951  2 Sheets-Sheet 1

INVENTOR.
Franz J. Neugebauer
BY Walter R. Brisken
Dybvig & Dybvig
Their Attorneys Dec. 29, 1953     W. R. BRISKEN ET AL     2,664,001
AIR CYCLE WATER COOLER Filed Sept. 8, 1951     2 Sheets-Sheet 2

INVENTOR.

Patented Dec. 29, 1953

2,664,001

UNITED STATES PATENT OFFICE 2,664,001

AIR CYCLE WATER COOLER

Walter R. Brisken, Dayton, Ohio, and Franz J. Neugebauer, Schenectady, N. Y.

Application September 8, 1951, Serial No. 245,686

13 Claims. (Cl. 62—150)

This invention relates to a refrigeration system and more particularly to an air cycle refrigeration system, wherein air having pressure less than the ambient air pressure is caused to circulate through water, thereby cooling the water, or is caused to circulate through some other refrigerant that may be used.

The use of water and air in refrigeration systems is broadly old. One method that has been used may be referred to as the water spray system, wherein water is atomized or broken up into a spray, passing through the air, preferably circulating air. Another system that has been used is to cause the air to evaporate water from a wetted surface.

An object of this invention is to cause finely divided bubbles of air at a pressure lower than atmospheric pressure to circulate through water, thereby causing evaporation, so as to cool the water. This has been accomplished by means of a turbine that is used in reducing the air pressure and thereby reducing the temperature of the air. The air from the turbine is fed to the bottom of a water reservoir, the top of which has a greatly reduced air pressure, thereby causing the air from the turbine to bubble upwardly through the water in the reservoir. The air bubbling up through the water in the reservoir is divided into a number of small bubbles or globules of air, so as to subject a great surface of the water to this sub-atmospheric pressure air. By reducing the pressure above the water, as is well known to those skilled in the art, the boiling point of the water is reduced, thereby aiding rapid evaporation thereof, the air that is caused to flow through the water absorbing heat from the water so as to rapidly cool the water. A unit weight of air at low pressure absorbs more water than the same unit weight of air at a higher pressure. Absorption of moisture by the air has a very decided cooling effect.

Another object of this invention is to provide an air cycle refrigeration system for cooling water when the water is to be used as drinking water or as a refrigerant to be used as a means for food preserving, liquid cooling, air conditioning, et cetera.

Other objects and advantages reside in the construction of parts, the combination thereof and the mode of operation, as will become more apparent from the following description.

Referring to the drawings,

Figure 1 is a schematic view of the air cycle water cooler used in directly cooling the water.

Figure 2:
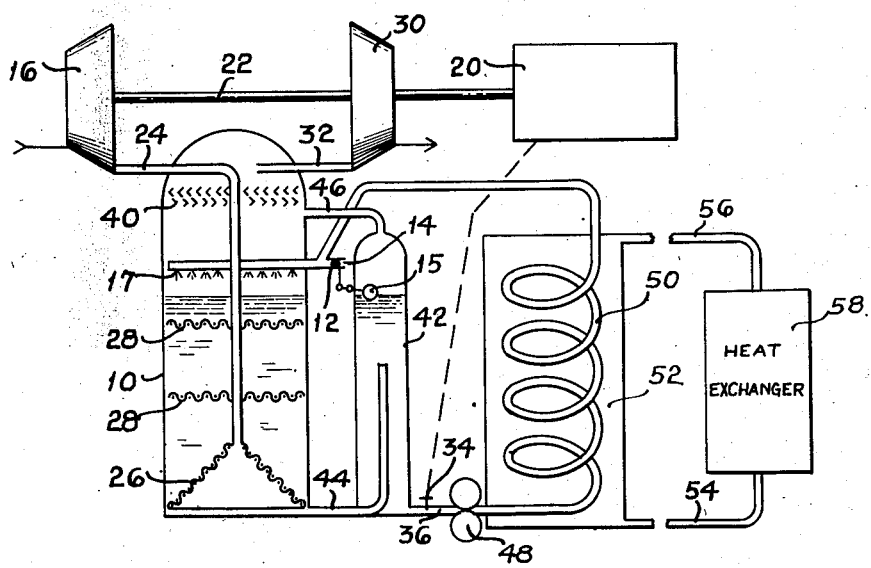

Figure 2 discloses a modification wherein the air cycle water cooler is used for indirectly transferring heat.

Figure 3:
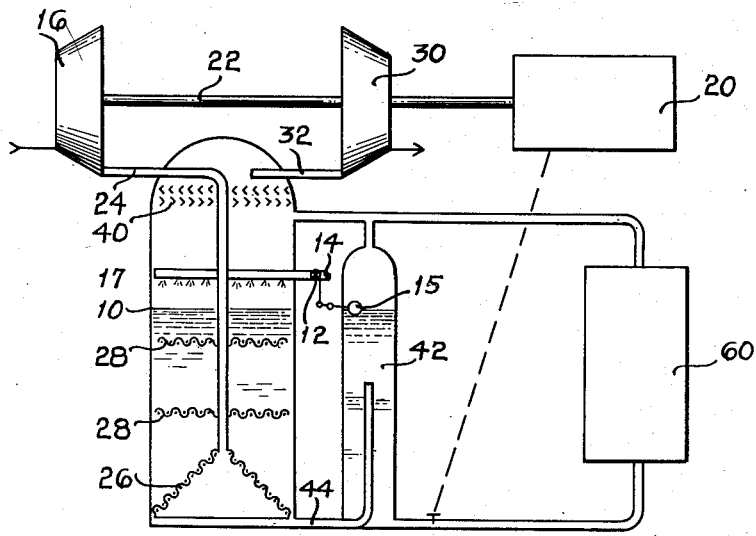

Figure 3 is another modification.

Figure 4:
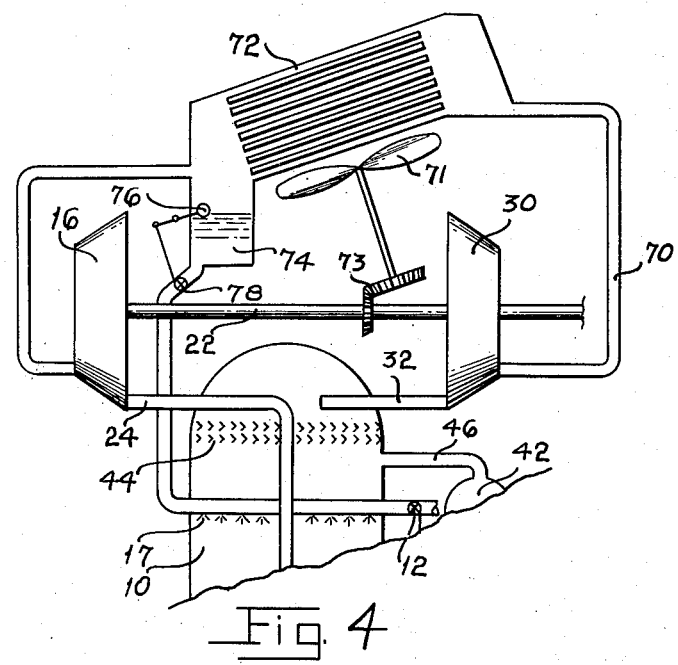

Figure 4 discloses another modification wherein water is reclaimed from the air.

In the embodiment disclosed in Figure 1, a reservoir 10 contains a supply of water, the height of which is controlled by a water supply fluid valve 12 actuated by a float 15, the water being supplied to an intake pipe 14 from a suitable source, as for example, water mains. The water may be added in the form of a spray 17. Air is supplied to the bottom of the reservoir 10 by means of a turbine 16. A prime mover 20 through a shaft 22 supplements the power delivered by the turbine to drive a compressor 30. As is well known to those skilled in the art, the turbine 16 reduces the pressure of the air, so that the outlet air from the turbine has a pressure less than the pressure of the air supplied to the turbine. Upon the pressure being reduced, air cools. That being the case, the air supplied to the reservoir 10 through the conduit 24 has a temperature considerably lower than the atmospheric temperature. The conduit 24 merges into a suitable screen or perforated frustum conical member 26, simulating an inverted funnel in shape. Although a frustum conical member has been shown, any other shape may be used. Furthermore, a plurality of screens 28 are arranged at various levels in the reservoir, these screens being used to divide each air bubble into a great number of smaller bubbles. These screens prevent accumulation of excessively large air bubbles and violent agitation of the water.

The air pressure above the water level in the reservoir 10 is reduced by means of the compressor 30 drawing air out from the top of the reservoir through a conduit 32. The pressure above the water in the reservoir 10 is lower than the output pressure of the turbine 16. By reducing the pressure above the water in the reservoir 10, the suction thus created causes the air from the turbine 16 to be drawn to the bottom of the conduit 24, terminating near the bottom of the reservoir 10, so that this air bubbles up through the water in the reservoir 10.

Several things take place during this operation. In the first place, the cold air from the turbine passing through the water in small bubbles absorbs heat from the water, thereby reducing the temperature of the water. Furthermore, the air passing through the water causes a certain amount of water to be evaporated and absorbed by the small bubbles of air passing upwardly through the water. Thus, a large surface area of the water is exposed to the rarefied air, causing rather rapid evaporation. Evaporation of water reduces temperature, in that a tremendous amount of heat is required to evaporate water. Thus, the water is cooled both by the cold air absorbing heat and by evaporation.

In the event the oxygen content of the water is low, as for example, if distilled water is supplied to the reservoir, or if the water has previously been boiled to sterilize the water, the air passing through the water aerifies the water, that is, supplies oxygen to the water so as to make it more palatable.

The air escaping from the compressor 30 is heated, in that upon compressing air it increases the temperature thereof, so that the air escaping from the compressor may have the same temperature as the atmospheric temperature, or it may be higher.

A thermostat 34 is connected into the outlet pipe or conduit 36 and is used in controlling the prime mover 20 which balances the power between the turbine 16 and the compressor 30. When the temperature of the water drops to a predetermined value, the thermostat 34 stops the prime mover until the temperature in the outlet conduit 36 exceeds the cutout temperature to a predetermined value, at which time the prime mover is again energized to cooperate with the turbine 16 in driving the compressor 30, thereby repeating the cycle.

The water or mist in the air in excess of evaporation is freed from the air when passing through water eliminators 40 extending across the top of the reservoir and above the level of the water. These water eliminators may consist of baffle-like members of expanded or formed sheet metal.

An air eliminator has also been provided. This air eliminator includes a cylindrical member 42, functioning as an auxiliary reservoir, connected by a conduit 44 to the bottom of the reservoir 10. The conduit 44 terminates below the water level, but a considerable distance above the bottom of the cylindrical member 42. Thus, air supplied by the conduit 24 that may be drawn out by the water through the conduit 44 is not likely to be drawn out through the outlet conduit 36, in that air would tend to float to the top. The top of the auxiliary reservoir 42 is connected by a conduit 46 to the reservoir 10 at a point above the water level. The conduit 46 functions as an air escape conduit. The conduit or outlet pipe 36 may be connected to a drinking fountain or to any other water outlet where the cold water may be used either for drinking or for cooling purposes. The water from the outlet conduit 36 may be raised to any suitable height or subjected to pressure by means of the water pump 48, driven from any suitable source of power and controlled in any suitable manner, as for example, in response to demand for water or in response to pressure differentials.

In the modification disclosed in Figure 2, the cool water preferably flows through a heat exchange cooling coil 50 mounted in a tank 52 having conduits 54 and 56 leading to a heat exchange unit 58, which may be a refrigeration unit, an air conditioning unit or any other type of heat exchanger used for cooling purposes. Furthermore, the heat exchange unit may be omitted and the water supplied to a drinking fountain. The solution used in the tank may be water, brine or any other suitable liquid that may be used in the transfer of heat. If brine or some other refrigerant is used in the reservoir 10 and water is used in the tank 52, the cooling coil 50 may become iced, to thereby provide a supply of ice for use when the demand increases in the heat exchanger, thereby supplementing the effectiveness of the cooling coil 50. If, for example, the heat exchange unit 58 is used during certain periods and it is desirable to operate the turbine 16 and the compressor 30 at some other period, ice may be frozen in the tank 52, to be used as a refrigerant during the period that there is no demand for the use of the turbine 16 and the compressor 30. Furthermore, if the prime mover 20 consists of an electric motor, it may, in some cases, be operated during the off peak load period for electricity, as, for example, from midnight until morning, so as to freeze water in the tank 52, the ice being used for cooling purposes during the peak load period, thereby utilizing inexpensive electric power in actuating the prime mover.

In the modification disclosed in Figure 3, the fluid in the reservoir 10 is supplied to a suitable heat exchange unit 60, where the fluid in the reservoir 10 is used as the heat exchange medium. In the preferred embodiment and all of the modifications, salt or other chemical or chemicals may be added to the water in the reservoir 10, so as to lower the freezing point of the water, to thereby increase the effectiveness of the air cooling system.

In some installations it may be desirable to reclaim the water evaporated and escaping with the air. In the modification disclosed in Figure 4, the air from the compressor 30 is supplied through a suitable conduit 70 to a condenser 72 used in reducing the dew point of the atmosphere sufficiently to precipitate or condense water from the air. A fan 71, driven through gears 72, is used in circulating air through the condenser. In order to prevent the air from the compressor 30 returning directly to the reservoir 10, the water is used to form a water lock. This water lock consists of a reservoir 74 provided with a suitable float 76 controlling a valve 78 for adding water to the reservoir 10 whenever the water in the reservoir 74 reaches a predetermined height. The float valve disclosed in this modification operates oppositely from conventional float valves, in that it permits drainage of water from the reservoir 74 whenever the water reaches a predetermined height and stops the drainage from the reservoir whenever the water drops to a predetermined level within the reservoir 74. Enough water remains in the reservoir 74 at all times to prevent air from escaping directly to the reservoir 10 without passing through the turbine 16.

In this modification the air flows through a closed path, that is, the air from the turbine passes through the water in the reservoir 10, through the compressor 30, through the condenser 72 and from there to the turbine 16. The water and its vapor used also passes through a closed circuit, namely, from the reservoir 10, through the compressor 30, through the condenser 72 into the reservoir 74 and from there it returns to the reservoir 10. Water that is not condensed from the air flows with the air through its closed path.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. An air cycle refrigerating system including a reservoir containing water, a turbine, a conduit extending from the turbine to a point near the bottom of the reservoir, a compressor used in removing the air from the reservoir above the water, a prime mover cooperating with the turbine in driving the compressor, means in the reservoir for breaking up the air bubbles bubbling up through the water from the conduit connecting the turbine to a point near the bottom of the reservoir, the turbine reducing the pressure of the air thereby cooling the air so that cooled and expanded air is delivered to the bottom of the reservoir, the air bubbling up through the water in the reservoir absorbing heat from the water in the reservoir, and means for utilizing the water in the reservoir.

2. An air cycle refrigeration system according to claim 1, wherein baffles are located in the reservoir above the level of the water for removing mist in the air.

3. A device according to claim 1, wherein means for breaking up the air bubbles in the reservoir consists of a plurality of screens arranged on different levels.

4. A device according to claim 1, wherein means are provided for removing air from the water, said means including a second reservoir located on the side of the first mentioned reservoir, a pair of conduits for connecting the bottom and the top of the second reservoir to the bottom and the top of the first reservoir, the conduit connecting the bottom of the first reservoir to the bottom of the second reservoir terminating in spaced relation from the bottom of the second reservoir so that as water flows from the first rservoir to the second reservoir the water is emptied into the second reservoir in spaced relation from the bottom so as to deter air from accumulating in the bottom of the second reservoir.

5. An air cycle refrigeration system according to claim 1, wherein the means for utilizing the water includes a reservoir having a cooling coil therein, the reservoir containing the cooling coil being connected to a heat exchange unit.

6. An air cycle refrigeration system including a reservoir containing water and a chemical added thereto for reducing the freezing point of the water, a turbine, a conduit extending from the turbine to a point near the bottom of the reservoir, a compressor used in removing air from the reservoir above the water, a prime mover cooperating with the turbine in driving the compressor to cause air to circulate through the water and the chemical added thereto, means in the reservoir for breaking up the air bubbles bubbling up through the water from the conduit extending from the turbine to a point near the bottom of the reservoir, a cooling coil located outside of the reservoir, means for circulating the water and the chemical from the reservoir through the cooling coil, the cooling coil being used as a heat exchange unit.

7. A device according to claim 6, wherein means are provided for removing air from the water and the chemical before the water and the chemical is circulated through the cooling coil, said means including an auxiliary reservoir having its top and bottom connected to the top and bottom of the first reservoir, the water from the first reservoir being discharged into the second reservoir in spaced relation from the bottom thereof.

8. An air cycle refrigeration system according to claim 6, wherein the cooling coil is located in a reservoir containing water, the cooling coil being used to freeze the water so as to produce ice available for supplementing the refrigeration system during heavy demand periods for refrigeration, the ice being formed during low demand periods.

9. An air cycle refrigeration system including a reservoir containing water, a turbine, a conduit extending from the turbine to a point near the bottom of the reservoir, a compressor used in removing the air from the reservoir above the water, a prime mover cooperating with the turbine in driving the compressor, a condenser, a conduit connecting the output of the compressor to the condenser, a pair of conduits extending from the condenser, one for the passage of the air to the turbine, and the other for the passage of water from the condenser to the reservoir so that both the water in liquid form and in vapor form passes through a closed circuit and the air passes in part through another closed circuit.

10. In an air cycle refrigeration system according to claim 9, wherein a water lock is provided between the condenser and the reservoir, said water lock including a tank having an intake opening at the outlet of the conduit extending from the compressor to the condenser, and an outlet opening near the bottom of the tank and connecting with a passage connecting the tank to the reservoir, a valve in the outlet opening for closing the passage from the tank to the reservoir, a float for opening the valve when the water in the tank reaches a predetermined height and for closing the valve when the water in the tank is lowered to a predetermined level, whereby the water in the tank prevents air escaping from the condenser directly to the reservoir without passing through the turbine.

11. In a refrigeration system including an expander, a reservoir containing water, a conduit extending from the expander to a point within the reservoir near the bottom of the reservoir, a compressor used in removing the air from the reservoir above the water, a prime mover cooperating with the expander in driving the compressor, a condenser, a conduit connecting the compressor to the condenser, a conduit connected from the condenser to the expander for passage of air to the expander, and a conduit extending from the condenser to the reservoir for passage of water in liquid form and vapor form through a closed circuit and for passage of air through another closed circuit.

12. In a refrigeration system including an expander, a reservoir containing water, a conduit extending from the expander to a point within the reservoir near the bottom of the reservoir, a compressor used in removing the air from the reservoir above the water, means in the reservoir for breaking up the air bubbles bubbling up through the water from the conduit connecting the expander to a point near the bottom of the reservoir, and means for utilizing the water in the reservoir.

13. An air cycle refrigerating system including a reservoir containing water, a compressor, a conduit leading from the compressor to a point within the reservoir above the water, a conduit connecting from the atmosphere to a point near the bottom of the reservoir, the compressor removing air from the reservoir above the water and causing air to move into the conduit from the atmosphere and thence up through the water, cooling the water by absorbing heat from the water, means within the reservoir for breaking up the air bubbles bubbling up through the water from the conduit connecting the atmosphere to a point near the bottom of the reservoir, and means for utilizing the cooled water in the reservoir.

WALTER R. BRISKEN.
FRANZ J. NEUGEBAUER.

References Cited in the file of this patent

UNITED STATES PATENTS

| Number | Name | Date |
|---|---|---|
| 2,175,162 | Waterfill | Oct. 3, 1939 |
| 2,175,163 | Waterfill | Oct. 3, 1939 |